United States Patent
James et al.

(10) Patent No.: US 10,725,818 B2
(45) Date of Patent: Jul. 28, 2020

(54) AGENT-BASED CONFIGURATION CO-MANAGEMENT TO SELECTIVELY MIGRATE WORKLOADS

(71) Applicant: Microsoft Technology Licensing, LLC, Redmond, WA (US)

(72) Inventors: David C. James, Snohomish, WA (US); Jason Robert Githens, Seattle, WA (US); Maayan Bar-Niv, Kirkland, WA (US); Gaurav Raghu Dhawan, Seattle, WA (US); Yongcheng Huang, Sammamish, WA (US); Prabagar Ramadasse, Sammamish, WA (US); Brett Damon Alan Flegg, Redmond, WA (US); Hang Heidi Cheng, Sammamish, WA (US); Loretta M. Macklem-Clements, Redmond, WA (US); Brad R. Anderson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 15/782,802

(22) Filed: Oct. 12, 2017

(65) Prior Publication Data
US 2019/0114203 A1 Apr. 18, 2019

(51) Int. Cl.
*G06F 9/48* (2006.01)
*H04L 12/24* (2006.01)

(52) U.S. Cl.
CPC .......... *G06F 9/4856* (2013.01); *H04L 41/042* (2013.01); *H04L 41/046* (2013.01); *H04L 41/0803* (2013.01); *H04L 41/0889* (2013.01); *H04L 41/0893* (2013.01)

(58) Field of Classification Search
None
See application file for complete search history.

(56) References Cited

U.S. PATENT DOCUMENTS

| 8,316,125 B2 * | 11/2012 | DeHaan | G06F 9/4856 709/224 |
| 2008/0320123 A1 * | 12/2008 | Houlihan | G06F 9/4856 709/224 |

* cited by examiner

*Primary Examiner* — Jeffrey R Swearingen
(74) *Attorney, Agent, or Firm* — Wade IP Law LLC

(57) ABSTRACT

Techniques are described herein that are capable of utilizing agent-based configuration co-management to selectively migrate workloads from a first configuration management authority to a second configuration management authority. The first configuration management authority has a first management client and a first management server that provides a first management service. The second configuration management authority has a second management client and a second management server that provides a second management service. An operating system that runs on a computing device enrolls the first management agent and the second management agent into the second configuration management authority. The first management agent negotiates with the second management agent to determine a first subset of the workloads that is to be handled by the first management agent and a second subset of the workloads that is to be handled by the second management agent.

21 Claims, 8 Drawing Sheets ns). Some example tasks that may be performed via
AGENT-BASED CONFIGURATION CO-MANAGEMENT TO SELECTIVELY MIGRATE WORKLOADS

BACKGROUND

Systems management typically refers to enterprise-wide administration of distributed systems (e.g., computer systems). Some example tasks that may be performed via systems management include but are not limited to anti-manipulation management, anti-virus and anti-malware management, security management, storage management, capacity monitoring, server availability monitoring and metrics, monitoring of user activities, network capacity and utilization monitoring, hardware inventory, and software inventory and installation.

Systems management often includes a variety of functional components, including but not limited to data center infrastructure management, help desk management, network management, security information and event management, and configuration management. Configuration management typically handles changes in a system systematically to maintain integrity of the system. Such changes may be implemented for beneficial purposes, including but not limited to revising capability of the system; increasing performance, reliability, and/or maintainability of the system; extending life of the system; reducing cost, risk, and/or liability of the system; and correcting defect(s) of the system.

As new configuration management solutions are made available, some users may be hesitant to convert from their traditional configuration management solutions to the new configuration management solutions. For example, the users may have IT systems, organizational structures, and processes that have been developed over many years, and converting from the traditional configuration management solutions to the new configuration management solutions may consume substantial resources. In another example, it may take some time for an entrenched, traditional culture of some users to evolve sufficiently to embrace the new configuration management solutions.

SUMMARY

Various approaches are described herein for, among other things, utilizing agent-based configuration co-management to selectively migrate workloads. Configuration co-management is configuration management having workloads that are handled (e.g., managed) among multiple configuration management authorities. Agent-based configuration co-management is configuration co-management in which agents of the configuration management authorities are used to determine subsets of the workloads that are to be handled by the respective configuration management authorities.

In an example approach, agent-based configuration co-management is utilized to selectively migrate workloads from a first configuration management authority to a second configuration management authority. The first configuration management authority has a first management client and a first management server that provides a first management service. The second configuration management authority has a second management client and a second management server that provides a second management service. It will be recognized that each of the first and second management services may be deployed on premises or on the cloud. An operating system that runs on a computing device enrolls the first management agent and the second management agent into the second configuration management authority. The first management agent negotiates with the second management agent to determine a first subset of the workloads that is to be handled by the first management agent and a second subset of the workloads that is to be handled by the second management agent. Each workload corresponds to a respective subset of a plurality of policies. The plurality of policies defines a plurality of respective behaviors of the computing device. Each behavior includes specified action(s) to be performed with regard to the computing device in response to specified condition(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
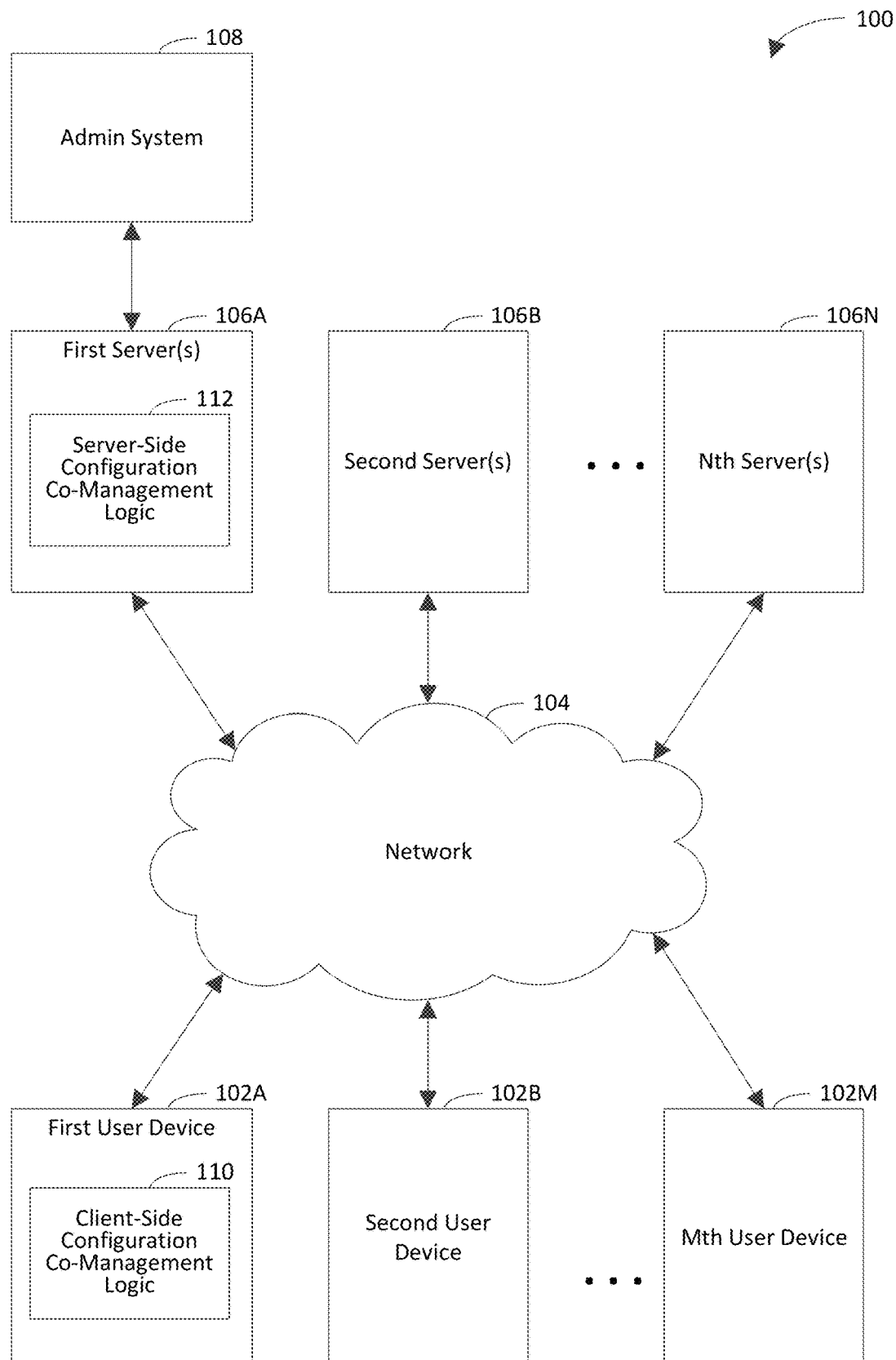
FIG. 1 is a block diagram of an example agent-based configuration co-management system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of utilizing agent-based configuration co-management to selectively migrate workloads. Configuration co-management is configuration management having workloads that are handled (e.g., managed) among multiple configuration management authorities. Agent-based configuration co-management is configuration co-management in which agents of the configuration management authorities are used to determine subsets of the workloads that are to be handled by the respective configuration management authorities. The workloads may be logical groupings of policies. The policies in each logical grouping may define respective behaviors of a computing device. Each behavior includes specified action(s) to be performed with regard to the computing device in response to specified condition(s). For instance, policies may be logically grouped to provide a workload pertaining to a virtual private network (VPN), a WiFi profile, an email profile, condition access, compliance, resource access, software updates, applications, general settings, or other suitable logical group. Further detail regarding some of these logical groups is provided in the following discussion.

Example techniques described herein have a variety of benefits as compared to conventional configuration management techniques. For instance, the example techniques may be capable of dividing (e.g., automatically dividing) workloads among multiple configuration management authorities. For example, the configuration management authorities may be used simultaneously to manage a device. The example techniques may enable information technology (IT) administrators to migrate workloads from a first configuration management authority to a second configuration management authority and/or vice versa. For instance, the example techniques may enable the IT administrators to migrate the workloads at their own pace (e.g., gradually, rather than all at once). The example techniques may simplify a process for migrating workflows among configuration management authorities. The example techniques may enable agents of respective configuration management authorities to negotiate which workloads they are to handle. The configuration management authorities may selectively apply policies for the workloads as a result of the negotiation. The example techniques may be capable of generating a unified report that includes information about the various workloads, even though the workloads are divided among multiple configuration management authorities.

The example techniques may reduce an amount of time and/or resources (e.g., processor cycles, memory, network bandwidth) that is consumed to manage a system. The example techniques may reduce a cost associated with managing the system. For instance, by enabling migration of fewer than all of the workloads at a time, the migration may begin sooner than it would under conventional migration techniques. Migrating workloads sooner enables those workloads to benefit from enhanced features of the recipient configuration management authority, which may reduce the time, cost, and/or resource consumption associated with handling those workloads. The example techniques may increase efficiency of a computing system that is used to perform configuration management operations.

The example techniques may increase efficiency of an IT administrator. For example, by enabling the IT administrator to migrate fewer than all workloads at a time, the example techniques may reduce a number of steps that are performed by the IT administrator, an amount of effort that the IT administrator expends, and/or an amount of time that the IT administrator takes to oversee the configuration management of the system.

The example techniques may increase efficiency of an end user. For example, by employing agent-based configuration co-management, the example techniques may enable the end user to benefit from enhanced features of the recipient configuration management authority sooner rather than later. Such enhanced features may enable the end user to work from any of a variety of locations using any of a variety of computing devices, choose the applications and technologies that the end user wants to use, etc.

FIG. 1 is a block diagram of an example agent-based configuration co-management system 100 in accordance with an embodiment. Generally speaking, agent-based configuration co-management system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, agent-based configuration co-management system 100 utilizes agent-based configuration co-management to selectively migrate workloads. Detail regarding techniques for utilizing agent-based configuration co-management to selectively migrate workloads is provided in the following discussion.

As shown in FIG. 1, agent-based configuration co-management system 100 includes a plurality of user systems 102A-102M, a network 104, a plurality of servers 106A-106N, and an admin system 108. Communication among user systems 102A-102M, servers 106A-106N, and admin system 108 is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the domains. Such domains may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

First user device 102A is shown to include client-side configuration co-management logic 110 for illustrative purposes. Client-side configuration co-management logic 110 is configured to perform client-side aspects of agent-based configuration co-management. For instance, client-side configuration co-management logic 110 may utilizing agent-based configuration co-management to selectively migrate workloads from a first configuration management authority to a second configuration management authority. The first configuration management authority may have a first management client and a first management server that provides a first management service. The second configuration management authority may have a second management client and a second management server that provides a second management service. Client-side configuration co-management logic 110 may enroll the first management agent and the second management agent into the second configuration management authority. Client-side configuration co-management logic 110 may cause the first management agent and the second management agent to negotiate to determine a first subset of the workloads that is to be handled by the first management agent and a second subset of the workloads that is to be handled by the second management agent. Each workload corresponds to a respective subset of a plurality of policies. The plurality of policies define a plurality of respective behaviors of first user device 102A. Each behavior includes specified action(s) to be performed with regard to first user device 102A in response to specified condition(s). Client-side configuration co-management logic 110 may cause the first management agent to manage the first subset of the workloads and the second management agent to manage the second subset of the workloads based on (based at least in part on) the negotiation between the first and second management agents. For instance, client-side configuration co-management logic 110 may cause the first management agent to manage the first subset of the workloads to comply with the corresponding policies of the first subset and cause the second management agent to manage the second subset of the workloads to comply with the corresponding policies of the second subset.

Servers 106A-106N are processing systems that are capable of communicating with user systems 102A-102M. Servers 106A-106N are configured to execute computer programs that provide information to user devices 102A-102M. For instance, servers 106A-106N may push such information to user devices 102A-102M or provide the information in response to requests that are received from user devices 102A-102M. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint. The information provided by servers 106A-106N may include documents (e.g., Web pages, images, audio files, video files, etc.), output of executables, or any other suitable type of information. In accordance with some example embodiments, servers 106A-106N are configured to host respective Web sites, so that the Web sites are accessible to users of agent-based configuration co-management system 100.

First server(s) 106A is shown to include server-side configuration co-management logic 112 for illustrative purposes. Server-side configuration co-management logic 112 is configured to perform server-side aspects of agent-based configuration co-management. For instance, server-side configuration co-management logic 112 may perform support operations to help client-side configuration co-management logic 110 utilize agent-based configuration co-management to selectively migrate the workloads from the first configuration management authority to the second configuration management authority. Server-side configuration co-management logic 112 may generate a unified report that includes information regarding the first subset of the workloads, which is handled by the first management agent, and information regarding the second subset of the workloads, which is handled by the second management agent. In one example, server-side configuration co-management logic 112 may cause the first management server to retrieve the information regarding the second subset of the workloads from the second management server and to generate the unified report. In another example, server-side configuration co-management logic 112 may cause the first management server to provide an authenticated, public-facing endpoint that exposes the information regarding the first subset of the workloads, which may enable the second management server to access the information regarding the first subset of the workloads and to generate the unified report. Server-side configuration co-management logic 112 may analyze policies corresponding to workloads to determine which of the workloads are ready to be migrated from the first configuration management authority to the second configuration management authority and/or operations that may be performed to cause the workloads to become ready for migration. Server-side configuration co-management logic 112 may report the aforementioned workloads and/or operations to the IT administrator of agent-based configuration co-management system 100.

Admin system 108 is a processing system that is capable of communicating with servers 106A-106N. Admin system 108 is configured to perform operations to facilitate agent-based configuration co-management in response to instructions that are received from the IT administrator of agent-based configuration co-management system 100. For instance, admin system 108 may provide commands to first server(s) 106A, indicating which workloads the IT administrator would like to migrate from the first configuration management authority to the second configuration management authority (or vice versa) based on instructions that are received form the IT administrator that specify those workflows.

Each of client-side configuration co-management logic 110 and server-side configuration co-management logic 112 may be implemented in various ways to utilize agent-based configuration co-management to selectively migrate workloads, including being implemented in hardware, software, firmware, or any combination thereof. For example, each of client-side configuration co-management logic 110 and server-side configuration co-management logic 112 may be implemented as computer program code configured to be executed in one or more processors. In another example, each of client-side configuration co-management logic 110 and server-side configuration co-management logic 112 may be at least partially implemented as hardware logic/electrical circuitry. For instance, each of client-side configuration co-management logic 110 and server-side configuration co-management logic 112 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Client-side configuration co-management logic 110 is shown to be incorporated in first user device 102A for illustrative purposes and is not intended to be limiting. It will be recognized that client-side configuration co-management logic 110 may be incorporated in any of the user systems 102A-102M. Server-side configuration co-management logic 112 is shown to be incorporated in first server(s) 106A for illustrative purposes and is not intended to be limiting. It will be recognized that server-side configuration co-management logic 112 may be incorporated in any one or more of the servers 106A-106N.

Figure 2:
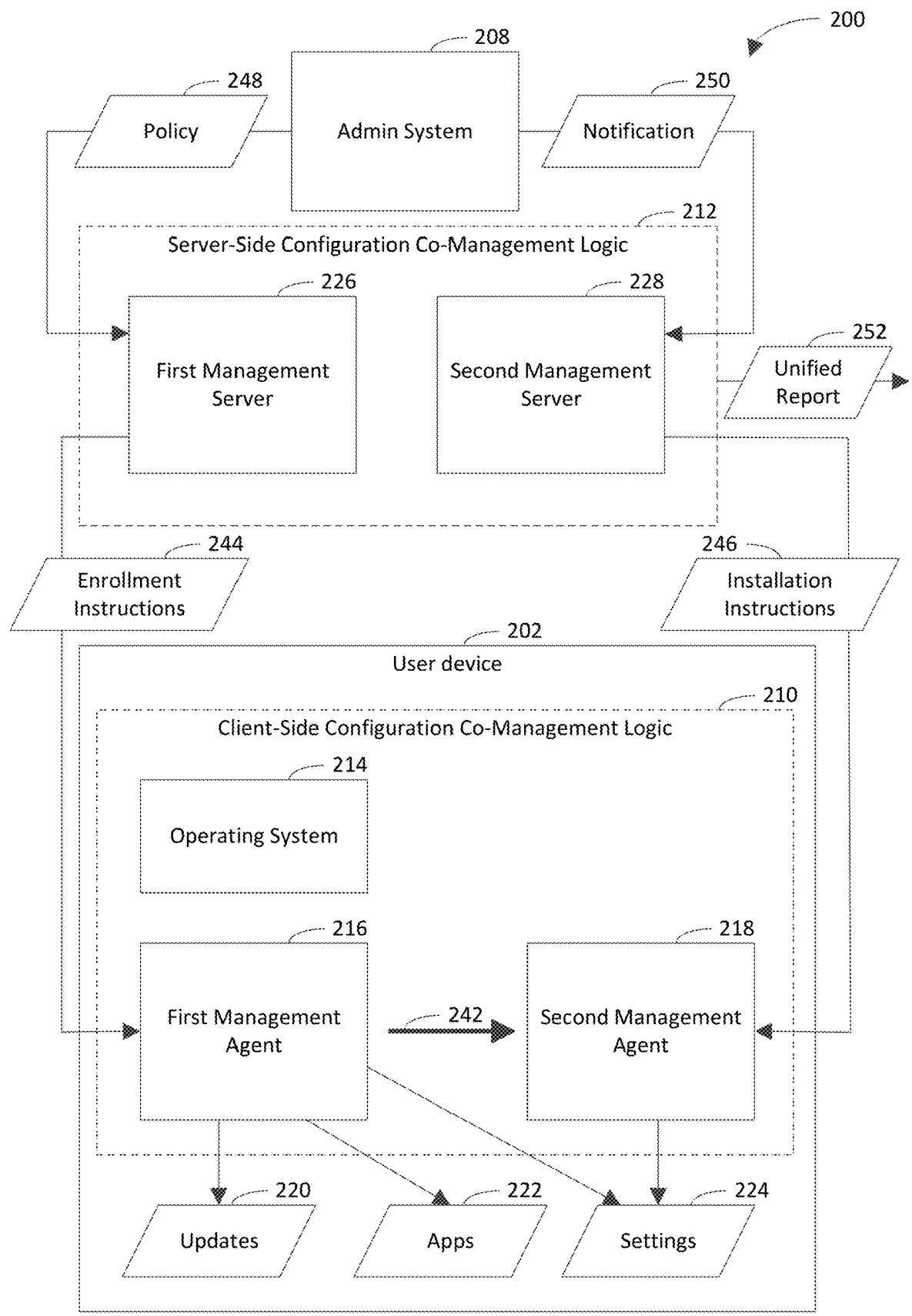
FIGS. 2-4 are block diagrams of example implementations of the agent-based configuration co-management system shown in FIG. 1 in accordance with embodiments.

FIG. 2 is a block diagram of an example agent-based configuration co-management system 200, which is an example implementation of the agent-based configuration co-management system 100 shown in FIG. 1 in accordance with an embodiment. Agent-based configuration co-management system 200 utilizes agent-based configuration co-management to selectively migrate workloads from a first configuration management authority to a second configuration management authority (and/or vice versa). The first configuration management authority has a first management agent 216 and a first management server 226. The second configuration management authority has a second management agent 218 and a second management server 228. First management agent 216, second management agent 218, first management server 226, and second management server 228 are discussed in further detail below.

As shown in FIG. 2, agent-based configuration co-management system 200 includes a user device 202, an admin system 208, and server-side configuration co-management logic 212. Admin system 208 is operable in a manner similar to admin system 108 shown in FIG. 1. Admin system 208 is configured to enable co-management of workloads in response to instructions received from the IT administrator of agent-based configuration co-management system 200. For instance, the instructions may specify that such co-management is to be enabled. Admin system 208 may receive the instructions via a console of the first configuration management authority. For example, admin system 208 may present a wizard to the IT administrator via a console of the first configuration management authority. The wizard may request credentials associated with the second configuration management authority. In response to the IT administrator providing the credentials, the wizard may provide an inquiry, asking whether the IT administrator wishes to enable co-management. In response to the IT administrator providing a response to the inquiry that indicates that the IT administrator wishes to enable co-management, admin system 208 generates instructions to cause co-management to be enabled.

For example, if second management agent 218 is not enrolled into the second configuration management authority, admin system 208 may generate a policy 248, which indicates that second management agent 218 is to be enrolled in the second configuration management authority. In another example, if first management agent 216 is not installed on user device 202 (e.g., and second management agent 218 is enrolled into the second configuration management authority), admin system 208 may generate instructions 250 to install first management agent 216 on user device 202. In accordance with this example, the response of the IT administrator may indicate that first management agent 216 is to be installed on user device 202 to enable co-management.

Server-side configuration co-management logic 212 is an example implementation of server-side configuration co-management logic 112 shown in FIG. 1. Server-side configuration co-management logic 212 includes first management server 226 and second management server 228. First management server 226 is configured to communicate with first management agent 216 to facilitate management of workloads that are handled by the first configuration management authority and to facilitate implementation of co-management. For instance, first management server 226 may apply a policy to first management agent 216, indicating which workloads should be managed by second management agent 218. In an example, to facilitate implementation of co-management, first management server 226 may provide (e.g., generate) enrollment instructions 244 based at least in part on the policy 248 that is generated by admin system 208. The enrollment instructions 244 indicate that second management agent 218 is to be enrolled in the second configuration management authority. The enrollment instructions 244 may be derived from the policy 248, and/or the enrollment instructions 244 may include the policy 248 itself. In another example, to facilitate implementation of co-management, the instructions that are generated by admin server 208 may include a notification 250 to indicate a presence of first management server 226 to second management server 228.

First management server 226 may utilize machine learning with regard to the policies corresponding to the workloads handled by the first configuration management authority to provide recommendations to the IT administrator. For instance, first management server 226 may recommend migrating (or not migrating) specified workloads based on a result of the machine learning. For example, first management server 226 may indicate that a designated type of workload should not be migrated to the second configuration management authority because features X, Y, and Z are being used, and the second configuration management authority does not (e.g., does not yet) support features X, Y, and Z. In another example, first management server 226 may recommend migrating a first subset of the workloads and not a second subset of the workloads based on the result of the machine learning. In accordance with this example, first management server 226 may specify actions to perform before the second subset of the workloads is to be migrated to the second configuration management authority.

Second management server 228 is configured to communicate with second management agent 218 to facilitate management of workloads that are handled by the second configuration management authority and to facilitate implementation of co-management. For instance, second management server 228 may set a policy, indicating which workloads second management agent is allowed to handle. To facilitate implementation of co-management, second management server 228 may generate installation instructions 246 to indicate that first management agent 216 is to be installed on user device 202.

Each of the first management server 226 and the second management server 228 may be configured to provide a unified report 252 that includes first information about the workloads handled by the first configuration management authority and second information about the workloads handled by the second configuration management authority. For instance, each of the first management server 226 and the second management server 228 may combine the first information and the second information and present the combined information via a common (e.g., single) interface. Unified reporting is discussed in further detail below with reference to FIGS. 5 and 6.

Each of the first management server 226 and the second management server 228 may be on the public cloud or on a private cloud (e.g., a corporate cloud). For instance, first management server 226 may be on a private cloud, and second management server 228 may be on the public cloud.

User device 202 includes client-side configuration co-management logic 210, which is an example implementation of client-side configuration co-management logic 110 shown in FIG. 1. Client-side configuration co-management logic 210 includes operating system 214, first management agent 216, and second management agent 218. Operating system 214 performs operations which may include but are not limited to managing computer hardware and software resources and providing services for computer programs (e.g., applications (a.k.a. apps) 222 and updates 220) on user device 202. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; iOS™ developed and distributed by Apple Inc., Microsoft Windows® developed and distributed by Microsoft Corporation; and UNIX™ developed and distributed by AT&T.

Operating system 214 may enroll user device 202 (and therefore first management agent 216) into the first configuration management authority. Although user device 202 may be enrolled into the first configuration management authority, user device 202 initially may not be enrolled in the second configuration management authority. User device 202 may have a first identity associated with the first configuration management authority that is used to enroll user device 202 into the first configuration management authority. Operating system 214 may cause second management server 228 to create a second identity associated with the second configuration management authority to enable operating system 214 to enroll user device 202 into the second configuration management authority. For instance, the enrollment instructions 244 may include a claim, which operating system 214 may provide to second management server 228 to cause second management server 228 to create the second identity. Operating system 214 may receive the second identity from second management server 228 in response to providing the claim to second management server 228. Operating system 214 may enroll user device 202 into the second configuration management authority using the second identity. Operating system 214 may inform second management server 228 that user device 202 is managed by the first configuration management authority, though the scope of the example embodiments is not limited in this respect.

Operating system 214 may instruct second management server 228 to set user device 202 to a read-only mode with respect to the second configuration management authority, though the scope of the example embodiments is not limited in this respect. The read-only mode limits operations that are performed on user device 202 to read-only operations. Accordingly, setting user device 202 to the read-only mode may reduce a likelihood that enrollment of user device 202 into the second configuration management authority will have a negative impact locally on user device 202. For instance, setting user device 202 to the read-only mode prior to enrolling user device into the second configuration management authority may cause the enrollment to have no negative impact locally on user device 202.

Operating system 214 may enroll second management agent 218 into the second configuration management authority based on operations performed by first management agent 216 via application programming interfaces (APIs) of operating system 214. It should be noted that enrolling user device 202 into the second configuration management authority enables user device 202 to be seen in a portal of the second configuration management authority. Enrolling first management agent 216 into the first configuration management authority enables workloads that are handled by first management agent 216 (and therefore the first management authority) to be seen in the portal. Enrolling second management agent 218 into the second configuration management authority enables workloads that are handled by second management agent 218 (and therefore the second management authority) to be seen in the portal.

If first management agent is not installed on user device 202, operating system 214 may install first management agent 216 on user device 202 based on operations performed by second management agent 218 via APIs of operating system 214.

First management agent 216 is configured to manage at least some updates 220, applications 222, and/or settings 224 associated with user device 202. First management agent 216 may use (e.g., automatically use) APIs of operating system 214 to cause operating system 214 to enroll second management agent 218 into the second configuration management authority, as depicted by arrow 242. For example, first management agent 216 may cause operating system 214 to enroll second management agent 218 into the second configuration management authority based at least in part on the enrollment instructions 244. In accordance with this example, first management agent 216 may provide the claim, which is included in the enrollment instructions 244, to operating system 214 to cause operating system 214 to enroll second management agent 218 into the second configuration management authority. If an error or exception occurs, first management agent 216 may report the error or exception to admin system 208 for troubleshooting.

In an example implementation, first management agent 216 sets a policy to create the second identity and monitors the policy. In accordance with this implementation, first management agent 216 provides the claim to operating system 214 for creation of the second identity. First management agent 216 receives the second identity in response to operating system 214 providing the claim to second management server 228. First management agent 216 may provide the second identity to a console of the first configuration management authority.

First management agent 216 is configured to negotiate with second management agent 218 to determine which of the workloads are to be handled by the first configuration management authority and which of the workloads are to be handled by the second configuration management authority. First management agent 216 selectively applies policies for the workloads based on the negotiation. For instance, first management agent 216 may apply policies for workloads that are to be handled by the first configuration management authority and block policies for workloads that are to be handled by the second configuration management authority. First management agent 216 may verify that second management agent 218 is enrolled in the second configuration management authority and that second management agent 218 is able to communicate with second management server 228 as a prerequisite for blocking policies for workloads that are to be handled by the second configuration management authority. For instance, first management agent 216 may report the policies that are blocked by first management agent 216 as "externally managed" in the console of the second configuration management authority. It will be recognized that each workload may be handled by a single management agent (e.g., first management agent 216 or second management agent 218) or by multiple management agents (e.g., first management agent 216 and second management agent 218).

First management agent 216 may be configured to monitor second management agent 218 and to repair second management agent 218 when an issue arises. For instance, first management agent 216 may monitor second management agent 218 to determine whether second management agent 218 is installed, is running, is active, etc. First management agent 216 may determine that an issue arises in response to second management agent 218 not being installed, not running, not being active, etc. If second management agent 218 is not installed, first management agent 216 may install second management agent 218. If second management agent 218 is not running, first management agent 216 may cause second management agent 218 to run. If second management agent 218 is not active, first management agent 216 may cause second management agent 218 to become active.

Second management agent 218 is configured to manage at least some updates 220, applications 222, and/or settings 224 associated with user device 202. Second management agent 218 may use (e.g., automatically use) APIs of operating system 214 to cause operating system 214 to install first management agent 216 on user device 202. For instance, second management agent 28 may cause operating system 214 to install (e.g., register) first management agent 216 on user device 202 based at least in part on installation instructions 246. If an error or exception occurs with regard to installation of first management agent 216, second management agent 218 may generate a report to indicate the error or exception. Second management agent 218 may provide the report to first management server 226.

Second management agent 218 is configured to negotiate with first management agent 216 to determine which of the workloads are to be handled by the first configuration management authority and which of the workloads are to be handled by the second configuration management authority. Second management agent 218 selectively applies policies for the workloads based on the negotiation. For instance, second management agent 218 may apply policies for workloads that are to be handled by the second configuration management authority and block policies for workloads that are to be handled by the first configuration management authority. Second management agent 218 may report the policies that are blocked by second management agent 218 as "externally managed" in the console of the second configuration management authority.

Second management agent 218 may be configured to monitor first management agent 216 and to repair first management agent 216 when an issue arises. For instance, second management agent 218 may monitor first management agent 216 to determine whether first management agent 216 is installed, is running, is active, etc. Second management agent 218 may determine that an issue arises in response to first management agent 216 not being installed, not running, not being active, etc. If first management agent 216 is not installed, second management agent 218 may install first management agent 216. If first management agent 216 is not running, second management agent 218 may cause first management agent 216 to run. If first management agent 216 is not active, second management agent 218 may cause first management agent 216 to become active.

Second management agent 218 is shown to be separate from operating system 214 in FIG. 2 for illustrative purposes and is not intended to be limiting. It will be recognized that second management agent 218 may be incorporated into operating system 214.

It will be recognized that agent-based configuration co-management system 200 may not include one or more of user device 202, admin system 208, client-side configuration co-management logic 210, server-side configuration co-management logic 212, operating system 214, first management agent 216, second management agent 218, first management server 226, and/or second management server 228. Furthermore, agent-based configuration co-management system 200 may include components in addition to or in lieu of user device 202, admin system 208, client-side configuration co-management logic 210, server-side configuration co-management logic 212, operating system 214, first management agent 216, second management agent 218, first management server 226, and/or second management server 228.

Some example types of workflows that may be migrated relatively seamlessly to the second configuration management authority immediately upon enablement of co-management will now be described for non-limiting, illustrative purposes. A first example type of workflow includes read-only operations (e.g., asset inventory), which may be safely enabled in co-management because they do not present a potential conflict. Thus, for the lifetime of a device (e.g., user device 202), first management agent 216 and second management agent 218 may report discovery and inventory information.

A second example type of workflow pertains to resource access (e.g., provisioning of WiFi, VPN, certificates, and email). For instance, the second example type of workflow may pertain to those resources that are implemented to configure a device (e.g., user device 202) for use by an end user. When an IT administrator switches from the first configuration management authority to the second configuration management authority, first management agent 216 may stop enforcing and/or provisioning resources and allow the second configuration management authority to take over such enforcing and/or provisioning.

A third example type of workflow pertains to general settings (e.g., device background, device configuration policies) of user device 202. The general settings may be managed by the first configuration management authority, the second configuration management authority, or both. Rather than merging policies, conflicts may be reported.

A fourth example type of workload pertains to conditional policy (a.k.a. conditional access). Conditional access enables an IT administrator to restrict access to corporate resources based on whether a device (e.g., user device 202) is compliant with corporate policies. Because conditional access has dependencies on cloud services, the fourth example type of workload (a.k.a. conditional access workload) may be a good candidate for migrating to the second configuration management authority if the second configuration management authority is cloud-based. When the conditional access workload is migrated to the second configuration management authority, first management agent 216 reduces enforcement of conditional access and compliance reporting and yields to second management agent 218. Further discussion of conditional access management is provided below with reference to FIG. 3.

Figure 3:
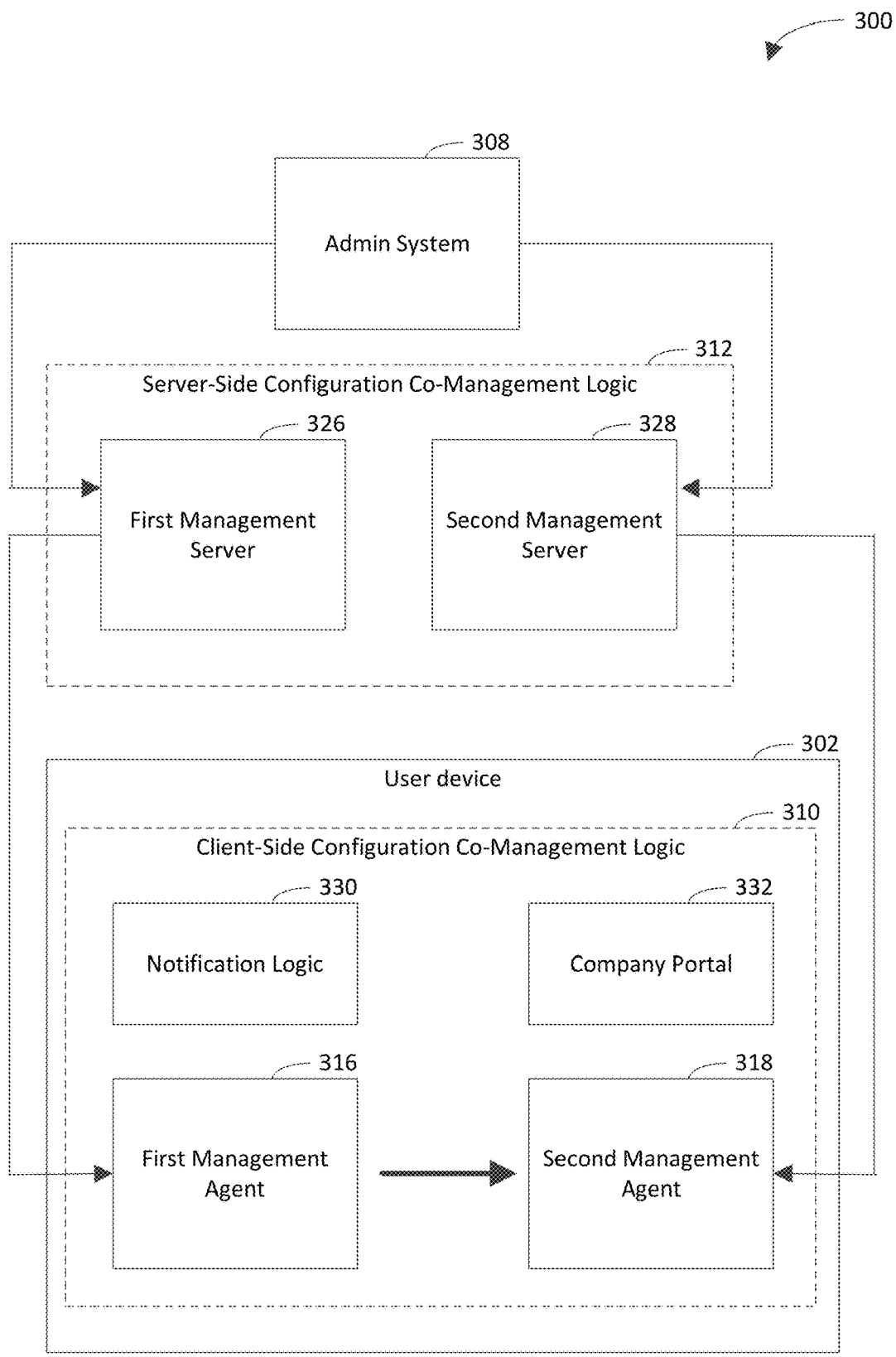

FIG. 3 is a block diagram of example agent-based configuration co-management system 300, which is another example implementation of the agent-based configuration co-management system 100 shown in FIG. 1 in accordance with an embodiment. Agent-based configuration co-management system 300 includes a user device 302, an admin system 308, and server-side configuration co-management logic 312, which are operable in a manner similar to user device 202, admin system 208, and server-side configuration co-management logic 212 shown in FIG. 2. Server-side configuration co-management logic 312 includes first management server 326 and second management server 328, which are operable in a manner similar to first management server 226 and second management server 228 shown in FIG. 2. User device 302 includes client-side configuration co-management logic 310. Client-side configuration co-management logic 310 includes first management agent 316 and second management agent 318, which are operable in a manner similar to first management agent 216 and second management agent 218 shown in FIG. 2. Client-side configuration co-management logic 310 further includes notification logic 330 and company portal 332.

Notification logic 330 is configured to provide application management and notification services. Notification logic 330 is associated with the first configuration management authority. Notification logic 330 may be a local app store. For instance, notification logic 330 may be a legacy solution, such as Microsoft's Software Center™.

Company portal 332 enables information regarding selected aspects of configuration co-management to be seen by an IT administrator. For example, company portal 332 may show status of conditional access. In accordance with this example, company portal 332 may not show information other than the status of conditional access.

In an example implementation, the first configuration management authority (e.g., first management server 326 and/or first management agent 316) may manage all application, setting, and update policy with the exception of conditional access-related settings. In accordance with this implementation, the second configuration management authority (e.g., second management server 328 and/or second management agent 318) may collect discovery and inventory data but enforce only conditional access policy.

The second configuration management authority may use user targeting, and a user may have first devices that are co-managed and second devices that are managed by the second configuration management authority. Targeting of policies may not be restricted in a user interface that is available to the IT administrator. Rather, such devices may be reported as being "externally managed."

A fifth example type of workload pertains to application management. Application management installs applications on a device (e.g., user device 202). It may be desirable to choose a single configuration management authority (e.g., the first configuration management authority or the second configuration management authority) for the fifth example type of workload (a.k.a. application management workload) to avoid having multiple configuration management authorities trying to provision the same application at the same time. A unified experience may be provided for an end user of user device 202 so that the end user does not feel that the applications are being managed by different authorities. Further discussion of application management is provided below with reference to FIG. 4.

Figure 4:
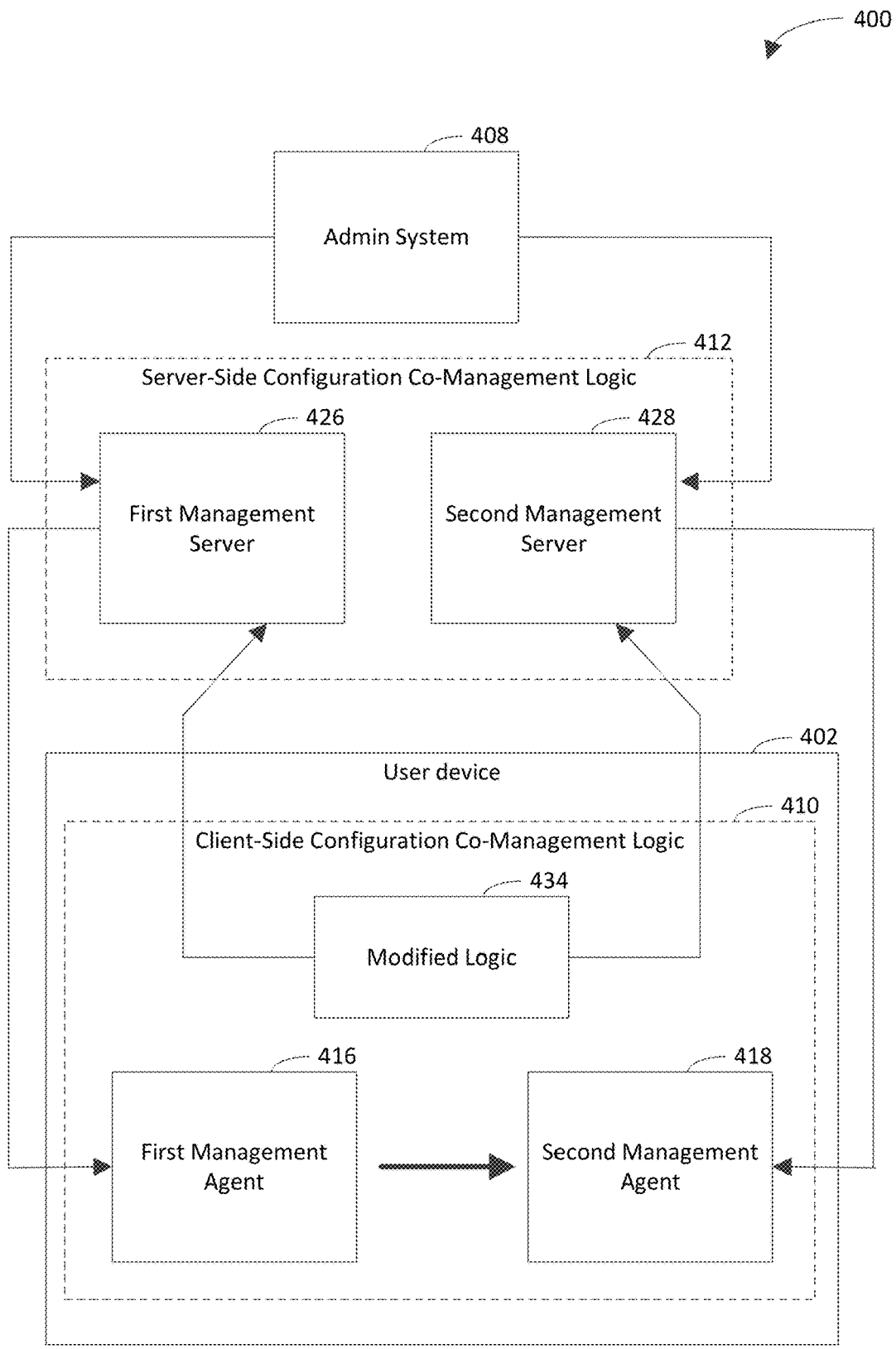

FIG. 4 is a block diagram of example agent-based configuration co-management system 400, which is yet another example implementation of the agent-based configuration co-management system 100 shown in FIG. 1 in accordance with an embodiment. Agent-based configuration co-management system 400 includes a user device 402, an admin system 408, and server-side configuration co-management logic 412, which are operable in a manner similar to user device 302, admin system 308, and server-side configuration co-management logic 312 shown in FIG. 3. Server-side configuration co-management logic 412 includes first management server 426 and second management server 428, which are operable in a manner similar to first management server 326 and second management server 328 shown in FIG. 3. User device 402 includes client-side configuration co-management logic 410. Client-side configuration co-management logic 410 includes first management agent 416 and second management agent 418, which are operable in a manner similar to first management agent 316 and second management agent 318 shown in FIG. 3. Client-side configuration co-management logic 410 further includes modified logic 434, which replaces notification logic 330 and company portal 332 of FIG. 3.

Modified logic 434 is configured to show first applications (e.g., Win32 applications), which are managed by the first configuration management authority (e.g., first management server 426 and/or first management agent 416), and second applications (e.g., Store applications), which are managed by the second configuration management authority (e.g., second management server 428 and/or second management agent 418). For instance, notification logic 330 or company portal 332, as depicted in FIG. 3, may be extended to provide modified logic 434 so that a unified experience is provided for the end user.

In an example implementation, the first configuration management authority may manage all application, setting, and update policy with the exception of conditional access-related settings. In accordance with this implementation, the second configuration management authority may collect discovery and inventory data but enforce only conditional access and application policy.

In addition to providing a unified experience for an end user as described above with reference to FIG. 4, it may be desirable to enable unified reporting for an IT administrator.

Figure 5:
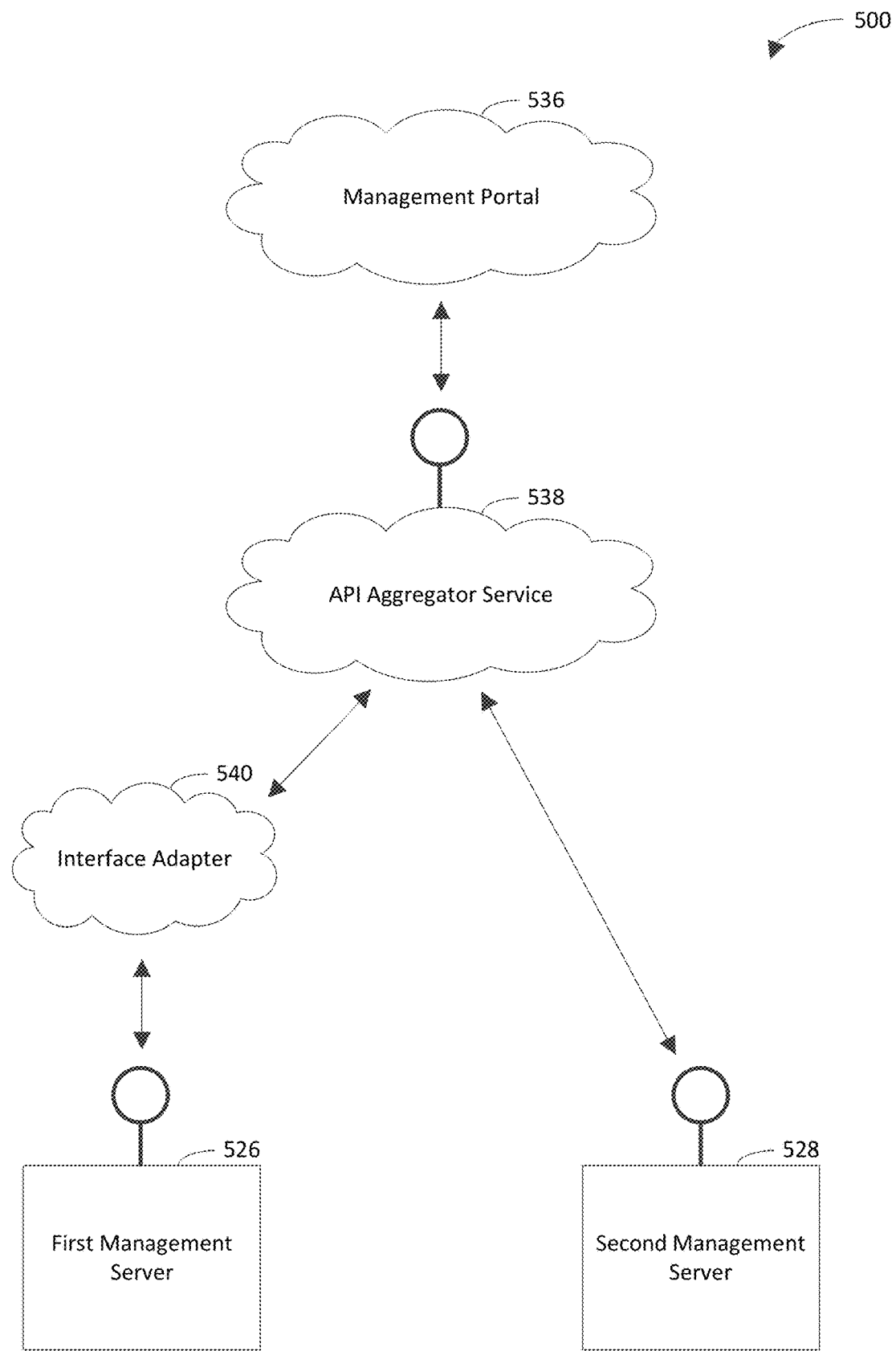
FIG. 5 is a block diagram of an example system to provide unified reporting in accordance with an embodiment.

FIG. 5 is a block diagram of an example system 500 to provide unified reporting in accordance with an embodiment. As shown in FIG. 5, system 500 includes a first management server 526, a second management server 528, a management portal 536, a API aggregator service 538, and an interface adapter 540.

First management server 526 facilitates management of first workloads, which are handled by a first configuration management authority. First management server 526 generates first data associated with the first workloads.

Second management server 528 facilitates management of second workloads, which are handled by a second configuration management authority. Second management server 528 generates second data associated with the second workloads.

Interface adapter 540 is a public-facing endpoint that is exposed by the first configuration management authority to mimic the second management authority. Interface adapter 540 enables a single UI/SDK to be used to perform management and reporting with regard to the first configuration management authority and the second configuration management authority. For instance, interface adapter 540 may "decorate" core objects, such as users and devices, with additional information that is known by only the first configuration management authority. By using interface adapter 540, a single caller (e.g., the Management UI) can query API aggregator service 538 and have the request serviced by the first configuration management authority, the second configuration management authority, or both. Interface adapter 540 is hosted by the first configuration management authority (e.g., first management server 526) in the embodiment of FIG. 5 for non-limiting, illustrative purposes, though it will be recognized that interface adapter 540 may be hosted by the second configuration management authority (e.g., second management server 528).

API aggregator service 538 is a standardized API used by services (e.g., all services of a designated provider) to expose objects and relationships in system 500. API aggregator service 538 may receive the first data from first management server 526 via interface adapter 540. API aggregator service 538 may receive the second data directly from second management server 528.

Management portal 536 is configured to show the first data and the second data (e.g., in a unified report). For instance, the first data may include inventory information received from the first configuration management authority, and the second data may include conditional access information received from the second configuration management authority.

In addition to or in lieu of the technique described above with reference to FIG. 5, the first configuration management authority may retrieve (e.g., periodically retrieve) the second data from the second configuration management authority. The first configuration management authority may store the second data locally in a database associated with the first configuration management authority. The first configuration management authority may provide the first data and the second data for viewing (e.g., in a unified report) via a portal that is associated with the first configuration management authority.

Figure 6:
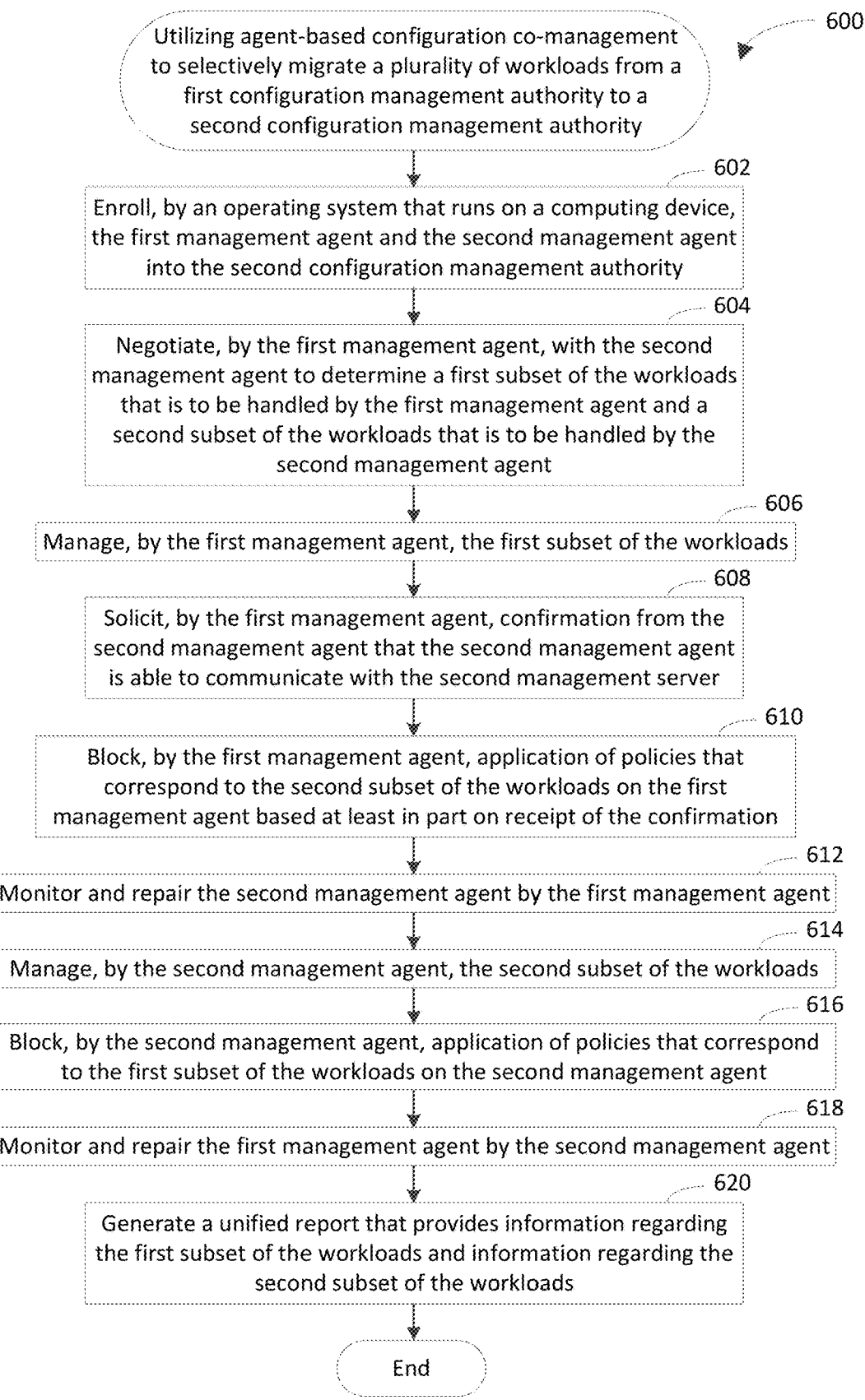
FIG. 6 depicts a flowchart of an example method for utilizing agent-based configuration co-management to selectively migrate workloads in accordance with an embodiment.

FIG. 6 depicts a flowchart 600 of an example method for utilizing agent-based configuration co-management to selectively migrate workloads from a first configuration management authority to a second configuration management authority in accordance with an embodiment. Flowchart 600 may be performed by agent-based configuration co-management system 100 shown in FIG. 1 or one or more portions thereof, for example. For illustrative purposes, flowchart 600 is described with respect to agent-based configuration co-management system 200 shown in FIG. 2. Further structural and operational embodiments will be apparent to persons skilled in the relevant art(s) based on the discussion regarding flowchart 600.

In the embodiment of FIG. 6, the first configuration management authority has a first management client and a first management server that provides a first management service. The second configuration management authority has a second management client and a second management server that provides a second management service. For example, the first configuration management authority may have first management client 216 and first management server 226, which provides the first management service. In accordance with this example, the second configuration management authority may have second management client 218 and second management server 228, which provides the second management service.

As shown in FIG. 6, the method of flowchart 600 begins at step 602. In step 602, the first management agent and the second management agent are enrolled into the second configuration management authority by an operating system that runs on a computing device. In an example implementation, operating system 214, which runs on user device 202, enrolls first management agent 216 and second management agent 218 into the second configuration management authority.

At step 604, a negotiation is performed by the first management agent with the second management agent to determine a first subset of the workloads that is to be handled by the first management agent and a second subset of the workloads that is to be handled by the second management agent. For instance, the negotiation may be performed in response to the first management agent and the second management agent being enrolled into the second configuration management authority at step 602. Each workload corresponds to a respective subset of a plurality of policies. The plurality of policies defines a plurality of respective behaviors of the computing device. Each behavior includes specified action(s) to be performed with regard to the computing device in response to specified condition(s). In an example implementation, first management agent 216 negotiates with second management agent 218 to determine a first subset of the workloads that is to be handled by first management agent 216 and a second subset of the workloads that is to be handled by second management agent 218.

In an example embodiment, the first subset of the workloads and the second subset of the workloads include at least one common workload. For instance, the first subset of the workloads and the second subset of the workloads may include one or more asset inventory workloads, which are to be handled by both the first management agent and the second management agent. Accordingly, the first configuration management authority and the second configuration management authority may handle one or more workloads that are the same. In an example, both the first configuration management authority and the second configuration management authority may handle read-only workloads. A read-only workload is a workload that consists of read-only operations.

In another example embodiment, negotiating with the second management agent at step 604 includes providing, by first management agent, first claims that are readable by the second management agent. The first claims indicate the second subset of the workloads that is to be handled by the second management agent. For instance, the first management agent may provide the first claims to the second management agent based at least in part on an administrator specifying that the second subset of the workloads is to be migrated from the first configuration management authority to the second configuration management authority.

In yet another example embodiment, negotiating with the second management agent at step 604 includes providing, by the first management agent, first claims that are readable by the second management agent. The first claims indicate a designated subset of the workloads to be handled by the second management agent. In accordance with this embodiment, negotiating with the second management agent at step 604 further includes receiving, by the first management agent, an indicator from the second management agent in response to generating the first claims. The indicator indicates that the second management agent provides second claims indicating that the second subset of the workloads, rather than the designated subset of the workloads, is to be handled by the second management agent. For example, second management agent 218 may determine which workloads are to be handled by second management agent 218 regardless which workloads are specified by first management agent 216. In another example, second management server 228 may limit which workloads second management agent 218 is allowed to handle. Second management agent 218 may provide the second claims to indicate that the second subset of the workloads is to be handled by second management agent 218 to comply with the limitation imposed by second management server 228.

In still another example embodiment, negotiating with the second management agent at step 604 includes handling, by the first management agent, the first subset of the workloads based at least in part on the second management agent generating claims that are readable by the first management agent. The claims indicate the first subset of the workloads to be handled by the first management agent.

At step 606, the first subset of the workloads is managed by the first management agent (e.g., in response to negotiating with the second management agent to determine the first subset of the workloads and the second subset of the workloads at step 604). In an example implementation, first management agent 216 manages the first subset of the workloads.

In an example embodiment, managing the first subset of the workloads at step 606 includes deferring, by the first management agent, to the second management agent to enforce conditional access policy and compliance reporting. For example, first management agent 216 may not enforce the conditional access policy unless second management agent 218 does not enforce the conditional access policy. In another example, first management agent 216 may not enforce the compliance reporting unless second management agent 218 does not enforce compliance reporting.

At step 608, confirmation is solicited by the first management agent from the second management agent that the second management agent is able to communicate with the second management server. In an example implementation, first management agent 216 solicits confirmation from second management agent 218 that second management agent 218 is able to communicate with second management server 228.

At step 610, application of policies that correspond to the second subset of the workloads is blocked on the first management agent by the first management agent based at least in part on receipt of the confirmation. In an example implementation, first management agent 216 blocks application of policies that correspond to the second subset of the workloads on first management agent 216 based at least in part on receipt of the confirmation.

At step 612, the second management agent is monitored and repaired by the first management agent. In an example implementation, first management agent 216 monitors and repairs second management agent 218.

At step 614, the second subset of the workloads is managed by the second management agent (e.g., in response to the first management agent negotiating with the second management agent to determine the first subset of the workloads and the second subset of the workloads at step 604). In an example implementation, second management agent 218 manages the second subset of the workloads.

At step 616, application of policies that correspond to the first subset of the workloads is blocked on the second management agent by the second management agent. In an example implementation, second management agent 218 blocks application of policies that correspond to the first subset of the workloads on second management agent 218.

At step 618, the first management agent is monitored and repaired by the second management agent. In an example implementation, second management agent 218 monitors and repairs first management agent 216.

At step 620, a unified report is generated that provides information regarding the first subset of the workloads and information regarding the second subset of the workloads. In an example implementation, first management server 226 or second management server 228 generates the unified report 252, which provides the information regarding the first subset of the workloads and the information regarding the second subset of the workloads.

In some example embodiments, one or more steps 602, 604, 606, 608, 610, 612, 614, 616, 618, and/or 620 of flowchart 600 may not be performed. Moreover, steps in addition to or in lieu of steps 602, 604, 606, 608, 610, 612, 614, 616, 618, and/or 620 may be performed. For instance, in an example embodiment, the method of flowchart 600 further includes retrieving, by the first management server, information regarding the second subset of the workloads from the second management server. For instance, first management server 226 may retrieve the information regarding the second subset of the workloads from second management server 228. In accordance with this embodiment, the method of flowchart 600 further includes generating, by the first management server, a unified report that provides information regarding the first subset of the workloads and the information regarding the second subset of the workloads. For instance, first management server 226 may generate the unified report 252, which provides information regarding the first subset of the workloads and the information regarding the second subset of the workloads.

In another example embodiment, the method of flowchart 600 further includes providing, by the first management server, an authenticated, public-facing endpoint that exposes information regarding the first subset of the workloads, which enables the second management server to generate a unified report that provides the information regarding the first subset of the workloads and information regarding the second subset of the workloads. For instance, first management server 226 may provide an authenticated, public-facing endpoint (e.g., via interface adapter 540 of FIG. 5) that exposes information regarding the first subset of the workloads, which enables second management server 228 to generate the unified report 252, which provides the information regarding the first subset of the workloads and the information regarding the second subset of the workloads.

In yet another example embodiment, the method of flowchart 600 further includes installing, by the operating system, the first management agent based at least in part on an instruction that is received from the second management server. For instance, operating system 214 may install first management agent 216 based at least in part on an instruction that is received from second management server 228.

In still another example embodiment, the computing device has a first identity associated with the first configuration management authority. For instance, user device 202 may have the first identity. In accordance with this embodiment, the method of flowchart 600 further includes setting, by the first management agent, a policy to create a second identity of the computing device that is associated with the second configuration management authority. For example, first management agent 216 may set a policy to create a second identity of user device 202 that is associated with the second configuration management authority. In further accordance with this embodiment, the method of flowchart 600 further includes causing, by the operating system, the second management server to create the second identity of the computing device that is associated with the second configuration management authority based at least in part on the policy. For instance, operating system 214 may cause second management server 228 to create the second identity of user device 202 based at least in part on the policy.

In another example embodiment, the method of flowchart 600 further includes analyzing, by the first management server, the plurality of policies using a machine learning technique to determine a designated subset of the workloads that is capable of being handled by the second configuration management authority without violating one or more of the policies with which the workloads in the designated subset correspond. For instance, first management server 226 may analyze the plurality of policies using the machine learning technique to determine the designated subset of the workloads. In accordance with this embodiment, the method of flowchart 600 further includes generating, by the first management server, a recommendation to be presented to an administrator of the computing device based at least in part on the designated subset of the workloads being capable of being handled by the second configuration management authority without violating one or more of the policies with which the workloads in the designated subset correspond. The recommendation recommends migration of the designated subset of the workloads from the first configuration management authority to the second configuration management authority. For instance, first management server 226 may generate the recommendation to be presented to an administrator of user device 202.

In yet another example embodiment, the method of flowchart 600 further includes analyzing, by the first management server, the plurality of policies using a machine learning technique to determine a designated subset of the workloads that is not capable of being handled by the second configuration management authority without violating one or more of the policies with which the workloads in the designated subset correspond. For instance, first management server 226 may analyze the plurality of policies using the machine learning technique to determine the designated subset of the workloads. In accordance with this embodiment, the method of flowchart 600 further includes generating, by the first management server, a recommendation to be presented to an administrator of the computing device based at least in part on the designated subset of the workloads not being capable of being handled by the second configuration management authority without violating one or more of the policies with which the workloads in the designated subset correspond. The recommendation recommends one or more actions to be performed to enable the designated subset of the workloads to be handled by the second configuration management authority without violating one or more of the policies with which the workloads in the designated subset correspond. For instance, first management server 226 may generate the recommendation to be presented to an administrator of user device 202.

In still another example embodiment, the method of flowchart 600 further includes stopping, by the first management agent, enforcement and provisioning of resources, in response to an administrator of the computing device migrating the workloads from the first configuration management authority to the second configuration management authority, to enable the second management agent to enforce and provision the resources. For instance, first management agent 216 may stop enforcement and provisioning of the resources, in response to an administrator of user device 202 migrating the workloads from the first configuration management authority to the second configuration management authority, to enable second management agent 218 to enforce and provision the resources.

In yet another example embodiment, the method of flowchart 600 further includes providing a user interface that identifies first applications managed by the first configuration management authority and second applications managed by the second configuration management authority. For instance, first management server 226 or second management server 228 may provide the user interface.

Figure 7:
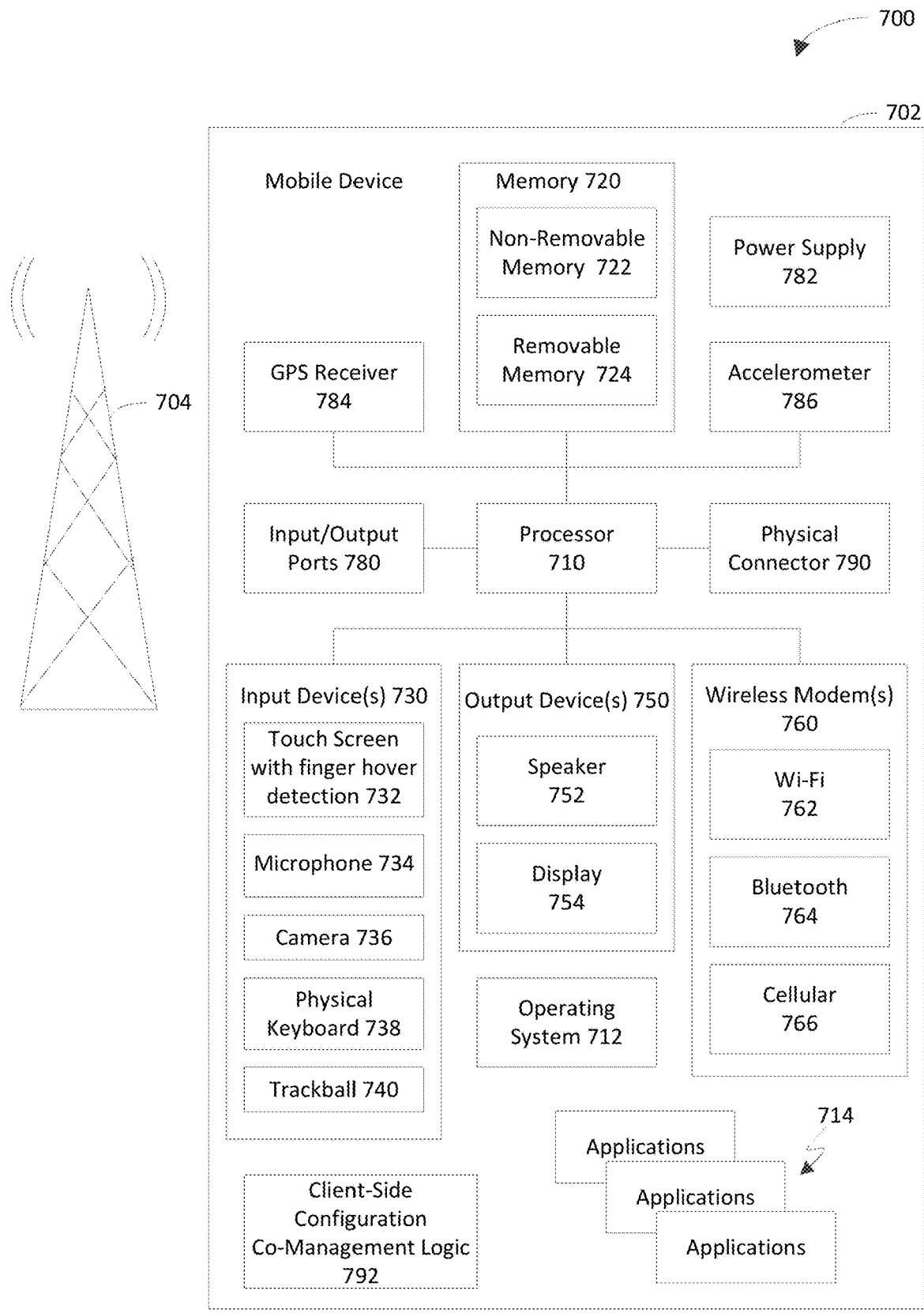
FIG. 7 is a system diagram of an exemplary mobile device in accordance with an embodiment.

FIG. 7 is a system diagram of an exemplary mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.) and may allow wireless two-way communications with one or more mobile communications networks 704, such as a cellular or satellite network, or with a local area or wide area network.

The mobile device 700 may include a processor 710 (e.g., signal processor, microprocessor, ASIC, or other control and processing logic circuitry) for performing such tasks as signal coding, data processing, input/output processing, power control, and/or other functions. An operating system 712 may control the allocation and usage of the components 702 and support for one or more applications 714 (a.k.a. application programs). The applications 714 may include common mobile computing applications (e.g., email applications, calendars, contact managers, web browsers, messaging applications) and any other computing applications (e.g., word processing applications, mapping applications, media player applications).

The mobile device 700 may include memory 720. The memory 720 may include non-removable memory 722 and/or removable memory 724. The non-removable memory 722 may include RAM, ROM, flash memory, a hard disk, or other well-known memory storage technologies. The removable memory 724 may include flash memory or a Subscriber Identity Module (SIM) card, which is well known in GSM communication systems, or other well-known memory storage technologies, such as "smart cards." The memory 720 may store data and/or code for running the operating system 712 and the applications 714. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches, or between 0.75 inches and 1 inch, or between 1 inch and 1.5 inches, etc.

The mobile device 700 may include client-side configuration co-management logic 792. The client-side configuration co-management logic 792 is configured to utilize agent-based configuration co-management to selectively migrate workloads in accordance with any one or more of the techniques described herein.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 760 may be coupled to antenna(s) (not shown) and may support two-way communications between the processor 710 and external devices, as is well understood in the art. The modem(s) 760 are shown generically and may include a cellular modem 766 for communicating with the mobile communication network 704 and/or other radio-based modems (e.g., Bluetooth 764 and/or Wi-Fi 762). At least one of the wireless modem(s) 760 is typically configured for communication with one or more cellular networks, such as a GSM network for data and voice communications within a single cellular network, between cellular networks, or between the mobile device and a public switched telephone network (PSTN).

The mobile device may further include at least one input/output port 780, a power supply 782, a satellite navigation system receiver 784, such as a Global Positioning System (GPS) receiver, an accelerometer 786, and/or a physical connector 790, which may be a USB port, IEEE 1394 (FireWire) port, and/or RS-232 port. The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of user devices 102A-102M, any one or more of servers 106A-106N, admin system 108, client-side configuration co-management logic 110, server-side configuration co-management logic 112, user device 202, admin system 208, client-side configuration co-management logic 210, server-side configuration co-management logic 212, first management agent 216, second management agent 218, first management server 226, second management server 228, user device 302, admin system 308, client-side configuration co-management logic 310, server-side configuration co-management logic 312, first management agent 316, second management agent 318, first management server 326, second management server 328, notification logic 330, company portal 332, user device 402, admin system 408, client-side configuration co-management logic 410, server-side configuration co-management logic 412, first management agent 416, second management agent 418, first management server 426, second management server 428, modified logic 434, first management server 526, second management server 528, management portal 536, API aggregator service 538, interface adapter 540, and/or flowchart 600 may be implemented in hardware, software, firmware, or any combination thereof.

For example, any one or more of user devices 102A-102M, any one or more of servers 106A-106N, admin system 108, client-side configuration co-management logic 110, server-side configuration co-management logic 112, user device 202, admin system 208, client-side configuration co-management logic 210, server-side configuration co-management logic 212, operating system 214, first management agent 216, second management agent 218, first management server 226, second management server 228, user device 302, admin system 308, client-side configuration co-management logic 310, server-side configuration co-management logic 312, first management agent 316, second management agent 318, first management server 326, second management server 328, notification logic 330, company portal 332, user device 402, admin system 408, client-side configuration co-management logic 410, server-side configuration co-management logic 412, first management agent 416, second management agent 418, first management server 426, second management server 428, modified logic 434, first management server 526, second management server 528, management portal 536, API aggregator service 538, interface adapter 540, and/or flowchart 600 may be implemented, at least in part, as computer program code configured to be executed in one or more processors.

In another example, any one or more of user devices 102A-102M, any one or more of servers 106A-106N, admin system 108, client-side configuration co-management logic 110, server-side configuration co-management logic 112, user device 202, admin system 208, client-side configuration co-management logic 210, server-side configuration co-management logic 212, first management agent 216, second management agent 218, first management server 226, second management server 228, user device 302, admin system 308, client-side configuration co-management logic 310, server-side configuration co-management logic 312, first management agent 316, second management agent 318, first management server 326, second management server 328, notification logic 330, company portal 332, user device 402, admin system 408, client-side configuration co-management logic 410, server-side configuration co-management logic 412, first management agent 416, second management agent 418, first management server 426, second management server 428, modified logic 434, first management server 526, second management server 528, management portal 536, API aggregator service 538, interface adapter 540, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example computing device comprises a memory storing an operating system and one or more processors coupled to the memory. The one or more processors are configured to utilize agent-based configuration co-management to selectively migrate a plurality of workloads from a first configuration management authority to a second configuration management authority. The first configuration management authority has a first management client and a first management server that provides a first management service. The second configuration management authority has a second management client and a second management server that provides a second management service. The one or more processors are configured to execute the operating system. The operating system is configured to enroll the first management agent and the second management agent into the second configuration management authority. The one or more processors are configured to execute the first management agent. The first management agent is configured to negotiate with the second management agent to determine a first subset of the workloads that is to be handled by the first management agent and a second subset of the workloads that is to be handled by the second management agent in response to the first management agent and the second management agent being enrolled into the second configuration management authority. Each workload corresponds to a respective subset of a plurality of policies. The plurality of policies defines a plurality of respective behaviors of the computing device. Each behavior includes one or more specified actions to be performed with regard to the computing device in response to one or more specified conditions.

In a first aspect of the example computing device, the first management server is configured to retrieve, from the second management server, information regarding the second subset of the workloads. In accordance with the first aspect, the first management server is configured to generate a unified report that provides information regarding the first subset of the workloads and the information regarding the second subset of the workloads.

In a second aspect of the example computing device, the first management server is configured to provide an authenticated, public-facing endpoint that exposes information regarding the first subset of the workloads, which enables the second management server to generate a unified report that provides the information regarding the first subset of the workloads and information regarding the second subset of the workloads. The second aspect of the example computing device may be implemented in combination with the first aspect of the example computing device, though the example embodiments are not limited in this respect.

In a third aspect of the example computing device, the operating system is configured to install the first management agent based at least in part on an instruction that is received from the second management server. The third aspect of the example computing device may be implemented in combination with the first and/or second aspect of the example computing device, though the example embodiments are not limited in this respect.

In a fourth aspect of the example computing device, the first management agent is configured to monitor and repair the second management agent. The fourth aspect of the example computing device may be implemented in combination with the first, second, and/or third aspect of the example computing device, though the example embodiments are not limited in this respect.

In a fifth aspect of the example computing device, the second management agent is configured to monitor and repair the first management agent. The fifth aspect of the example computing device may be implemented in combination with the first, second, third, and/or fourth aspect of the example computing device, though the example embodiments are not limited in this respect.

In a sixth aspect of the example computing device, the first management agent is configured to provide first claims that are readable by the second management agent, the first claims indicating the second subset of the workloads that is to be handled by the second management agent. The sixth aspect of the example computing device may be implemented in combination with the first, second, third, fourth, and/or fifth aspect of the example computing device, though the example embodiments are not limited in this respect.

In a seventh aspect of the example computing device, the first management agent is configured to solicit confirmation from the second management agent that the second management agent is able to communicate with the second management server. In accordance with the seventh aspect, the first management agent is configured to block application of policies that correspond to the second subset of the workloads on the first management agent based at least in part on receipt of the confirmation. The seventh aspect of the example computing device may be implemented in combination with the first, second, third, fourth, fifth, and/or sixth aspect of the example computing device, though the example embodiments are not limited in this respect.

In an eighth aspect of the example computing device, the first management agent is configured to provide first claims that are readable by the second management agent. The first claims indicate a designated subset of the workloads to be handled by the second management agent. In accordance with the eighth aspect, the first management agent is configured to receive an indicator from the second management agent in response to generating the first claims, the indicator indicating that the second management agent provides second claims indicating that the second subset of the workloads, rather than the designated subset of the workloads, is to be handled by the second management agent. The eighth aspect of the example computing device may be implemented in combination with the first, second, third, fourth, fifth, sixth, and/or seventh aspect of the example computing device, though the example embodiments are not limited in this respect.

In a ninth aspect of the example computing device, the first management agent is configured to handle the first subset of the workloads based at least in part on the second management agent generating claims that are readable by the first management agent, the claims indicating the first subset of the workloads to be handled by the first management agent. The ninth aspect of the example computing device may be implemented in combination with the first, second, third, fourth, fifth, sixth, seventh, and/or eighth aspect of the example computing device, though the example embodiments are not limited in this respect.

In a tenth aspect of the example computing device, the computing device has a first identity associated with the first configuration management authority. In accordance with the tenth aspect, the first management agent is configured to set a policy to create a second identity of the computing device that is associated with the second configuration management authority. In further accordance with the tenth aspect, the operating system is configured to cause the second management server to create the second identity of the computing device that is associated with the second configuration management authority based at least in part on the policy. The tenth aspect of the example computing device may be implemented in combination with the first, second, third, fourth, fifth, sixth, seventh, eighth, and/or ninth aspect of the example computing device, though the example embodiments are not limited in this respect.

In an eleventh aspect of the example computing device, the first management server is configured to analyze the plurality of policies using a machine learning technique to determine a designated subset of the workloads that is capable of being handled by the second configuration management authority without violating one or more of the policies with which the workloads in the designated subset correspond. In accordance with the eleventh aspect, the first management server is configured to generate a recommendation to be presented to an administrator of the computing device based at least in part on the designated subset of the workloads being capable of being handled by the second configuration management authority without violating one or more of the policies with which the workloads in the designated subset correspond, The recommendation recommends migration of the designated subset of the workloads from the first configuration management authority to the second configuration management authority. The eleventh aspect of the example computing device may be implemented in combination with the first, second, third, fourth, fifth, sixth, seventh, eighth, ninth, and/or tenth aspect of the example computing device, though the example embodiments are not limited in this respect.

In a twelfth aspect of the example computing device, the first management server is configured to analyze the plurality of policies using a machine learning technique to determine a designated subset of the workloads that is not capable of being handled by the second configuration management authority without violating one or more of the policies with which the workloads in the designated subset correspond. In accordance with the twelfth aspect, the first management server is configured to generate a recommendation to be presented to an administrator of the computing device based at least in part on the designated subset of the workloads not being capable of being handled by the second configuration management authority without violating one or more of the policies with which the workloads in the designated subset correspond. The recommendation recommends one or more actions to be performed to enable the designated subset of the workloads to be handled by the second configuration management authority without violating one or more of the policies with which the workloads in the designated subset correspond. The twelfth aspect of the example computing device may be implemented in combination with the first, second, third, fourth, fifth, sixth, seventh, eighth, ninth, tenth, and/or eleventh aspect of the example computing device, though the example embodiments are not limited in this respect.

In a thirteenth aspect of the example computing device, the first subset of the workloads and the second subset of the workloads include one or more asset inventory workloads, which are to be handled by both the first management agent and the second management agent. The thirteenth aspect of the example computing device may be implemented in combination with the first, second, third, fourth, fifth, sixth, seventh, eighth, ninth, tenth, eleventh, and/or twelfth aspect of the example computing device, though the example embodiments are not limited in this respect.

In a fourteenth aspect of the example computing device, the first management agent is configured to defer to the second management agent to enforce conditional access policy and compliance reporting. The fourteenth aspect of the example computing device may be implemented in combination with the first, second, third, fourth, fifth, sixth, seventh, eighth, ninth, tenth, eleventh, twelfth, and/or thirteenth aspect of the example computing device, though the example embodiments are not limited in this respect.

In a fifteenth aspect of the example computing device, the first management agent is configured to stop enforcing and provisioning resources, in response to an administrator of the computing device migrating the workloads from the first configuration management authority to the second configuration management authority, to enable the second management agent to enforce and provision the resources. The fifteenth aspect of the example computing device may be implemented in combination with the first, second, third, fourth, fifth, sixth, seventh, eighth, ninth, tenth, eleventh, twelfth, thirteenth, and/or fourteenth aspect of the example computing device, though the example embodiments are not limited in this respect.

In a sixteenth aspect of the example computing device, the one or more processors are configured to provide a user interface that identifies first applications managed by the first configuration management authority and second applications managed by the second configuration management authority. The sixteenth aspect of the example computing device may be implemented in combination with the first, second, third, fourth, fifth, sixth, seventh, eighth, ninth, tenth, eleventh, twelfth, thirteenth, fourteenth, and/or fifteenth aspect of the example computing device, though the example embodiments are not limited in this respect.

In an example method, agent-based configuration co-management is utilized to selectively migrate a plurality of workloads from a first configuration management authority to a second configuration management authority. The first configuration management authority has a first management client and a first management server that provides a first management service. The second configuration management authority has a second management client and a second management server that provides a second management service. The utilizing comprises enrolling, by an operating system that runs on a computing device, the first management agent and the second management agent into the second configuration management authority. The utilizing further comprises negotiating, by the first management agent, with the second management agent to determine a first subset of the workloads that is to be handled by the first management agent and a second subset of the workloads that is to be handled by the second management agent in response to the first management agent and the second management agent being enrolled into the second configuration management authority. Each workload corresponds to a respective subset of a plurality of policies. The plurality of policies defines a plurality of respective behaviors of the computing device. Each behavior includes one or more specified actions to be performed with regard to the computing device in response to one or more specified conditions. The utilizing further comprises managing, by the first management agent, the first subset of the workloads in response to negotiating with the second management agent to determine the first subset of the workloads and the second subset of the workloads.

In a first aspect of the example method, the utilizing further comprises retrieving, by the first management server, information regarding the second subset of the workloads from the second management server. In accordance with the first aspect, the utilizing further comprises generating, by the first management server, a unified report that provides information regarding the first subset of the workloads and the information regarding the second subset of the workloads.

In a second aspect of the example method, the utilizing further comprises providing, by the first management server, an authenticated, public-facing endpoint that exposes information regarding the first subset of the workloads, which enables the second management server to generate a unified report that provides the information regarding the first subset of the workloads and information regarding the second subset of the workloads. The second aspect of the example method may be implemented in combination with the first aspect of the example method, though the example embodiments are not limited in this respect.

An example computer program product comprises a computer-readable storage medium having instructions recorded thereon for enabling a processor-based system to perform steps. The steps comprise utilize agent-based configuration co-management to selectively migrate a plurality of workloads from a first configuration management authority to a second configuration management authority. The first configuration management authority has a first management client and a first management server that provides a first management service. The second configuration management authority has a second management client and a second management server that provides a second management service. Utilization of the agent-based configuration co-management comprises enroll, by an operating system that runs on a computing device, the first management agent and the second management agent into the second configuration management authority. Utilization of the agent-based configuration co-management further comprises negotiate, by the first management agent, with the second management agent to determine a first subset of the workloads that is to be handled by the first management agent and a second subset of the workloads that is to be handled by the second management agent in response to the first management agent and the second management agent being enrolled into the second configuration management authority. Each workload corresponds to a respective subset of a plurality of policies. The plurality of policies defines a plurality of respective behaviors of the computing device. Each behavior includes one or more specified actions to be performed with regard to the computing device in response to one or more specified conditions.

An example system comprises means for utilizing agent-based configuration co-management to selectively migrate a plurality of workloads from a first configuration management authority to a second configuration management authority. The first configuration management authority has a first management client and a first management server that provides a first management service. The second configuration management authority has a second management client and a second management server that provides a second management service. The means for utilizing the agent-based configuration co-management comprises means for causing an operating system that runs on a computing device to enroll the first management agent and the second management agent into the second configuration management authority. The means for utilizing the agent-based configuration co-management further comprises means for causing the first management agent to negotiate with the second management agent to determine a first subset of the workloads that is to be handled by the first management agent and a second subset of the workloads that is to be handled by the second management agent in response to the first management agent and the second management agent being enrolled into the second configuration management authority. Each workload corresponds to a respective subset of a plurality of policies. The plurality of policies defines a plurality of respective behaviors of the computing device. Each behavior includes one or more specified actions to be performed with regard to the computing device in response to one or more specified conditions.

IV. Example Computer System

Figure 8:
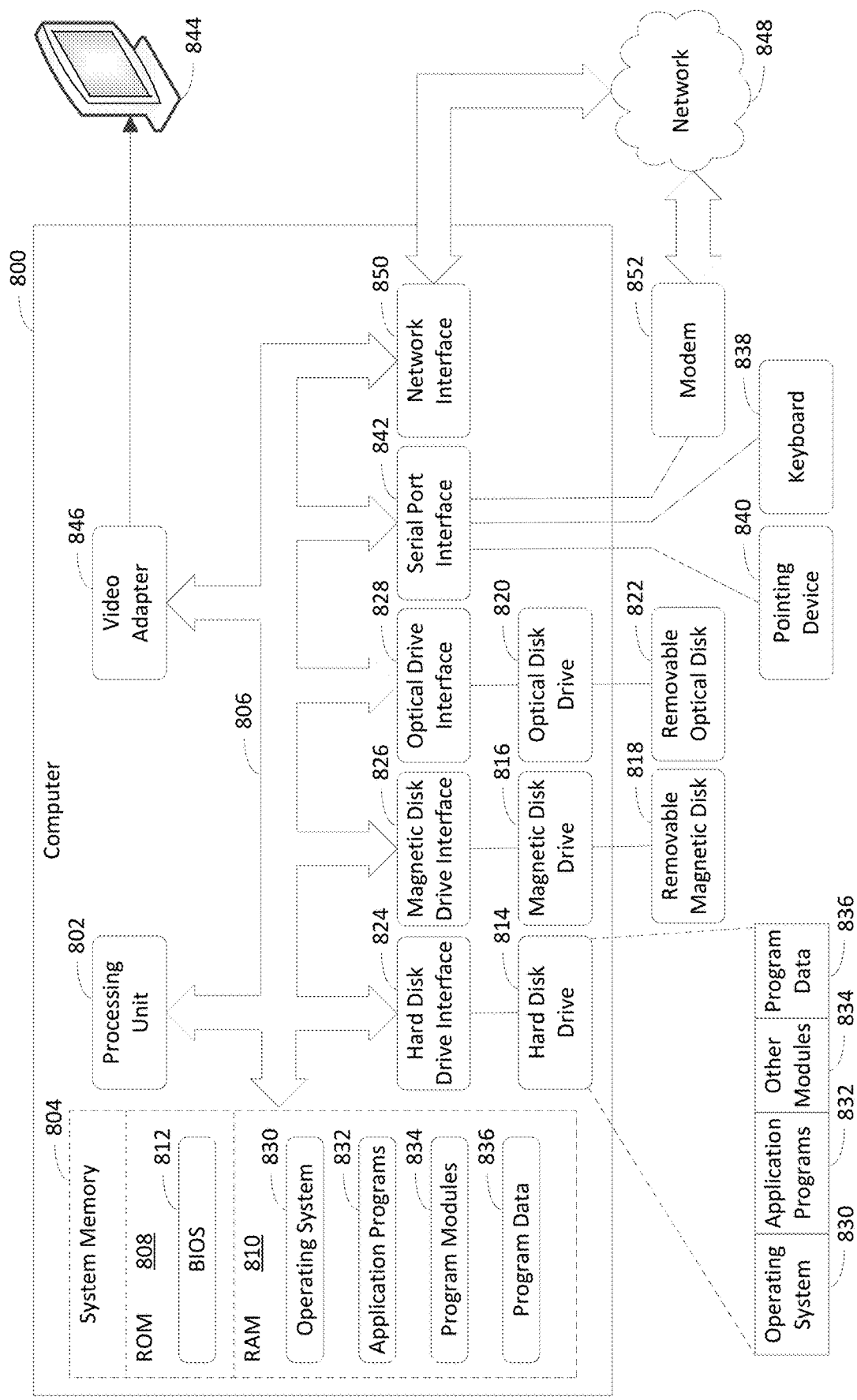
FIG. 8 depicts an example computer in which embodiments may be implemented.

FIG. 8 depicts an example computer 800 in which embodiments may be implemented. Any one or more of user systems 102A-102M, any one or more of servers 106A-106N, and/or admin system 108 shown in FIG. 1; user device 202, admin system 208, first management server 226, and/or second management server 228 shown in FIG. 2; user device 302, admin system 308, first management server 326, and/or second management server 328 shown in FIG. 3; user device 402, admin system 408, first management server 426, and/or second management server 428 shown in FIG. 4; and/or first management server 526 and/or second management server 528 shown in FIG. 5 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) client-side configuration co-management logic 110, server-side configuration co-management logic 112, client-side configuration co-management logic 210, server-side configuration co-management logic 212, operating system 214, first management agent 216, second management agent 218, first management server 226, second management server 228, client-side configuration co-management logic 310, server-side configuration co-management logic 312, first management agent 316, second management agent 318, first management server 326, second management server 328, notification logic 330, company portal 332, client-side configuration co-management logic 410, server-side configuration co-management logic 412, first management agent 416, second management agent 418, first management server 426, second management server 428, modified logic 434, first management server 526, second management server 528, management portal 536, API aggregator service 538, interface adapter 540, and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing device comprising:
a memory storing an operating system; and
one or more processors coupled to the memory and configured to utilize agent-based configuration co-management to selectively migrate a plurality of workloads from a first configuration management authority to a second configuration management authority, the first configuration management authority having a first management agent and a first management server that provides a first management service, the second configuration management authority having a second management agent and a second management server that provides a second management service,
the one or more processors configured to execute the operating system, the operating system configured to enroll the first management agent and the second management agent into the second configuration management authority,
the one or more processors configured to execute the first management agent, the first management agent configured to negotiate with the second management agent to determine a first subset of the workloads that is to be handled by the first management agent and a second subset of the workloads that is to be handled by the second management agent in response to the first management agent and the second management agent being enrolled into the second configuration management authority,
each workload corresponding to a respective subset of a plurality of policies, the plurality of policies defining a plurality of respective behaviors of the computing device, each behavior including one or more specified actions to be performed with regard to the computing device in response to one or more specified conditions.

2. The computing device of claim 1, wherein the first management server is configured to retrieve, from the second management server, information regarding the second subset of the workloads; and
wherein the first management server is configured to generate a unified report that provides information regarding the first subset of the workloads and the information regarding the second subset of the workloads.

3. The computing device of claim 1, wherein the first management server is configured to provide an authenticated, public-facing endpoint that exposes information regarding the first subset of the workloads, which enables the second management server to generate a unified report that provides the information regarding the first subset of the workloads and information regarding the second subset of the workloads.

4. The computing device of claim 1, wherein the operating system is configured to install the first management agent based at least in part on an instruction that is received from the second management server.

5. The computing device of claim 1, wherein the first management agent is configured to monitor and repair the second management agent.

6. The computing device of claim 1, wherein the second management agent is configured to monitor and repair the first management agent.

7. The computing device of claim 1, wherein the first management agent is configured to provide first claims that are readable by the second management agent, the first claims indicating the second subset of the workloads that is to be handled by the second management agent.

8. The computing device of claim 1, wherein the first management agent is configured to solicit confirmation from the second management agent that the second management agent is able to communicate with the second management server; and
wherein the first management agent is configured to block application of policies that correspond to the second subset of the workloads on the first management agent based at least in part on receipt of the confirmation.

9. The computing device of claim 1, wherein the first management agent is configured to provide first claims that are readable by the second management agent, the first claims indicating a designated subset of the workloads to be handled by the second management agent; and
wherein the first management agent is configured to receive an indicator from the second management agent in response to generating the first claims, the indicator indicating that the second management agent provides second claims indicating that the second subset of the workloads, rather than the designated subset of the workloads, is to be handled by the second management agent.

10. The computing device of claim 1, wherein the first management agent is configured to handle the first subset of the workloads based at least in part on the second management agent generating claims that are readable by the first management agent, the claims indicating the first subset of the workloads to be handled by the first management agent.

11. The computing device of claim 1, wherein the computing device has a first identity associated with the first configuration management authority;
wherein the first management agent is configured to set a policy to create a second identity of the computing device that is associated with the second configuration management authority; and
wherein the operating system is configured to cause the second management server to create the second identity of the computing device that is associated with the second configuration management authority based at least in part on the policy.

12. The computing device of claim 1, wherein the first management server is configured to analyze the plurality of policies using a machine learning technique to determine a designated subset of the workloads that is capable of being handled by the second configuration management authority without violating one or more of the policies with which the workloads in the designated subset correspond; and wherein the first management server is configured to generate a recommendation to be presented to an administrator of the computing device based at least in part on the designated subset of the workloads being capable of being handled by the second configuration management authority without violating one or more of the policies with which the workloads in the designated subset correspond, the recommendation recommending migration of the designated subset of the workloads from the first configuration management authority to the second configuration management authority.

13. The computing device of claim 1, wherein the first management server is configured to analyze the plurality of policies using a machine learning technique to determine a designated subset of the workloads that is not capable of being handled by the second configuration management authority without violating one or more of the policies with which the workloads in the designated subset correspond; and wherein the first management server is configured to generate a recommendation to be presented to an administrator of the computing device based at least in part on the designated subset of the workloads not being capable of being handled by the second configuration management authority without violating one or more of the policies with which the workloads in the designated subset correspond, the recommendation recommending one or more actions to be performed to enable the designated subset of the workloads to be handled by the second configuration management authority without violating one or more of the policies with which the workloads in the designated subset correspond.

14. The computing device of claim 1, wherein the first subset of the workloads and the second subset of the workloads include one or more asset inventory workloads, which are to be handled by both the first management agent and the second management agent.

15. The computing device of claim 1, wherein the first management agent is configured to defer to the second management agent to enforce conditional access policy and compliance reporting.

16. The computing device of claim 1, wherein the first management agent is configured to stop enforcing and provisioning resources, in response to an administrator of the computing device migrating the workloads from the first configuration management authority to the second configuration management authority, to enable the second management agent to enforce and provision the resources.

17. The computing device of claim 1, wherein the one or more processors are configured to provide a user interface that identifies first applications managed by the first configuration management authority and second applications managed by the second configuration management authority.

18. A method comprising:
utilizing agent-based configuration co-management to selectively migrate a plurality of workloads from a first configuration management authority to a second configuration management authority, the first configuration management authority having a first management agent and a first management server that provides a first management service, the second configuration management authority having a second management agent and a second management server that provides a second management service, the utilizing comprising:

enrolling, by an operating system that runs on a computing device, the first management agent and the second management agent into the second configuration management authority;

negotiating, by the first management agent, with the second management agent to determine a first subset of the workloads that is to be handled by the first management agent and a second subset of the workloads that is to be handled by the second management agent in response to the first management agent and the second management agent being enrolled into the second configuration management authority, each workload corresponding to a respective subset of a plurality of policies, the plurality of policies defining a plurality of respective behaviors of the computing device, each behavior including one or more specified actions to be performed with regard to the computing device in response to one or more specified conditions; and managing, by the first management agent, the first subset of the workloads in response to negotiating with the second management agent to determine the first subset of the workloads and the second subset of the workloads.

19. The method of claim 18, wherein the utilizing further comprises:
retrieving, by the first management server, information regarding the second subset of the workloads from the second management server; and
generating, by the first management server, a unified report that provides information regarding the first subset of the workloads and the information regarding the second subset of the workloads.

20. The method of claim 18, wherein the utilizing further comprises:
providing, by the first management server, an authenticated, public-facing endpoint that exposes information regarding the first subset of the workloads, which enables the second management server to generate a unified report that provides the information regarding the first subset of the workloads and information regarding the second subset of the workloads.

21. A system comprising:
means for utilizing agent-based configuration co-management to selectively migrate a plurality of workloads from a first configuration management authority to a second configuration management authority, the first configuration management authority having a first management agent and a first management server that provides a first management service, the second configuration management authority having a second management agent and a second management server that provides a second management service, the means for utilizing the agent-based configuration co-management comprising:
means for causing an operating system that runs on a computing device to enroll the first management agent and the second management agent into the second configuration management authority; and
means for causing the first management agent to negotiate with the second management agent to determine a first subset of the workloads that is to be handled by the first management agent and a second subset of the workloads that is to be handled by the second management agent in response to the first management agent and the second management agent being enrolled into the second configuration management authority, each workload corresponding to a respective subset of a plurality of policies, the plurality of policies defining a plurality of respective behaviors of the computing device, each behavior including one or more specified actions to be performed with regard to the computing device in response to one or more specified conditions.

\* \* \* \* \*